May 23, 1939.  W. L. MORRISON  2,159,599
AUTOMOBILE RADIATOR COOLING APPARATUS
Filed Feb. 23, 1934  2 Sheets-Sheet 1
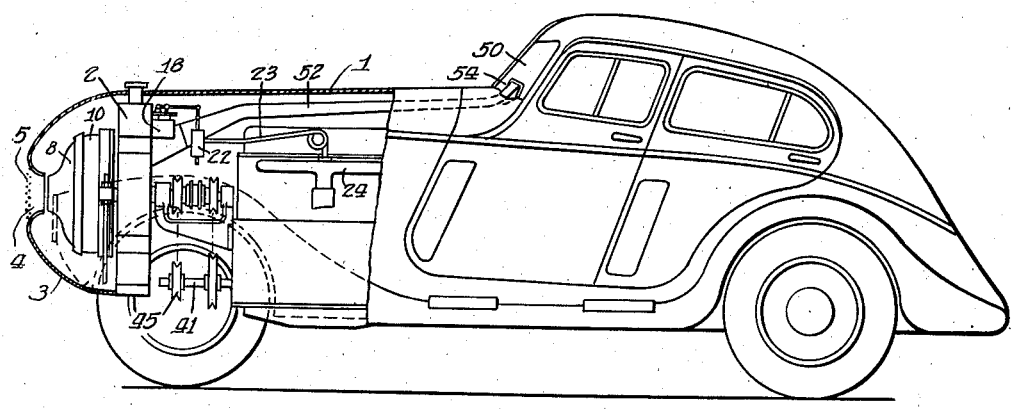
Fig. 1
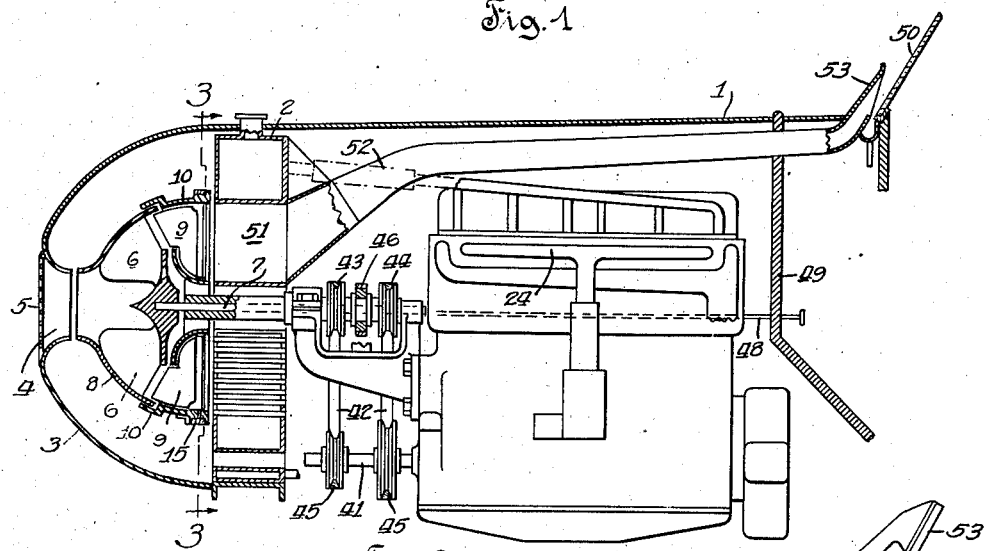
Fig. 2
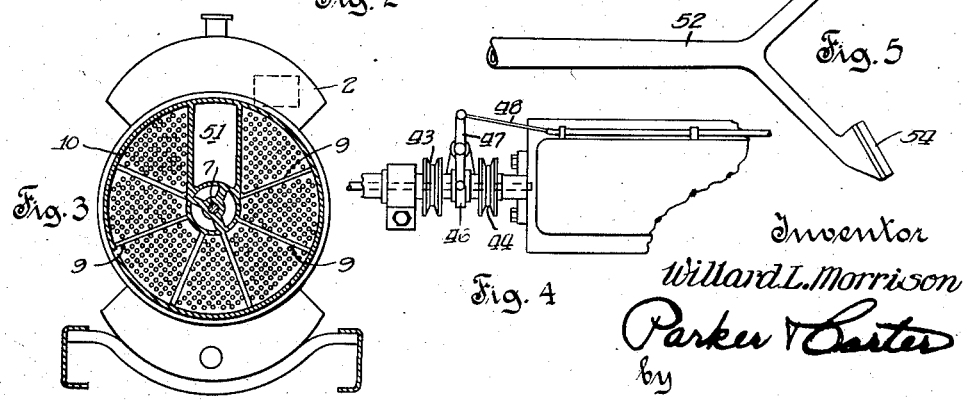
Fig. 3
Fig. 4
Fig. 5
Inventor
Willard L. Morrison
by Parker & Carter
Attorneys May 23, 1939.  W. L. MORRISON  2,159,599
AUTOMOBILE RADIATOR COOLING APPARATUS
Filed Feb. 23, 1934   2 Sheets-Sheet 2
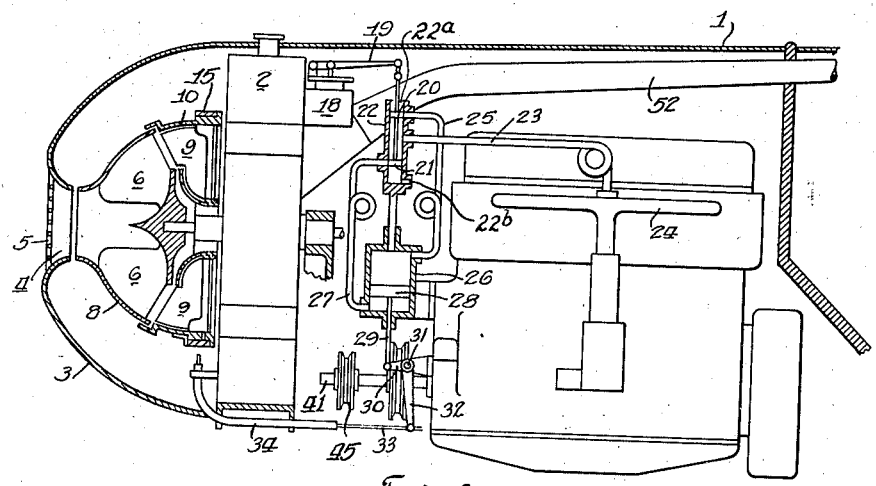
Fig. 6
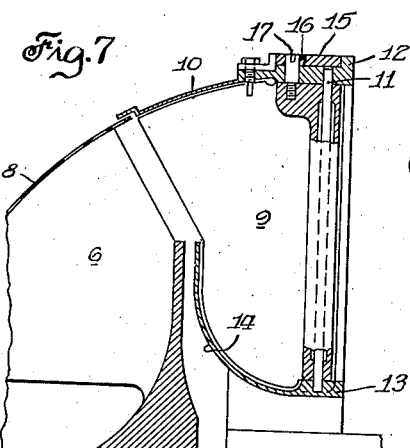
Fig. 7
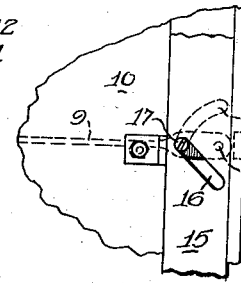
Fig. 8
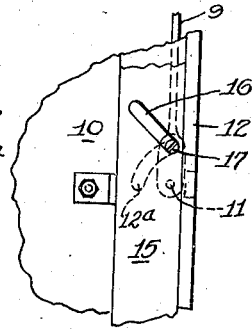
Fig. 9
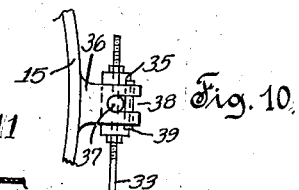
Fig. 10
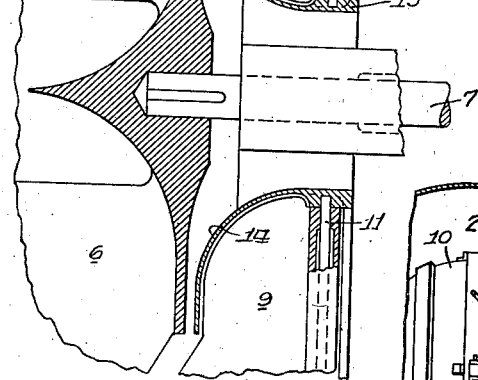
Fig. 11
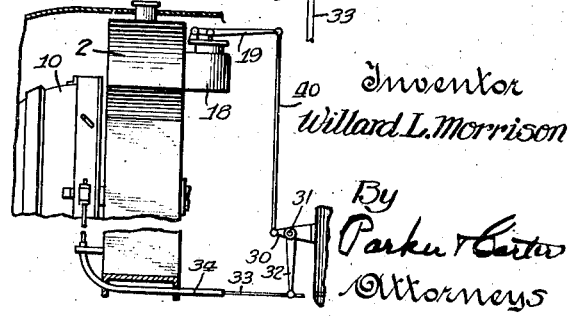
Inventor
Willard L. Morrison
By
Parker & Carter
Attorneys Patented May 23, 1939

2,159,599

UNITED STATES PATENT OFFICE 2,159,599

AUTOMOBILE RADIATOR COOLING APPARATUS

Willard L. Morrison, Lake Forest, Ill.

Application February 23, 1934, Serial No. 712,464

10 Claims. (Cl. 123—174)

This invention relates to automobile radiator cooling apparatus and has for its object to provide a new and improved apparatus of this description. The invention has as a further object to provide an automobile radiator cooling apparatus which will utilize less power than the apparatus now in use.

In the present day automobiles with the streamlining effect, the front area of the radiators is being reduced and the length of the cooling tubes increased. This is necessary to get sufficient cooling area. This increase in the length of the cooling tubes increases the resistance of the air therethrough, and the result is that the fan construction now used cannot properly force the air through these long tubes. The present invention has as a further object to provide a means for overcoming this difficulty and for forcing the air through these long radiator tubes effectively and efficiently. The invention has as a further object to accomplish this result by means of a centrifugal blower located in front of the radiator, and controlling apparatus therefor.

The invention has as a further object to provide an automobile radiator cooling apparatus wherein the air need of the radiator is automatically controlled. The invention has other objects which are more particularly pointed out in the accompanying description.

Referring now to the drawings, Fig. 1 is a view showing one form of apparatus embodying the invention, the automobile parts being broken away so that the apparatus may be more easily understood and its construction and location recognized;

Fig. 2 is an enlarged sectional view through the hood of the automobile shown in Fig. 1;

Fig. 3 is a sectional view taken on line 3—3 of Fig. 2;

Fig. 4 is a view showing the clutch mechanism for connecting the blower with the engine shaft;

Fig. 5 is a view of the air nozzles for directing air along the wind shield;

Fig. 6 is a section through the hood of the automobile showing the controlling apparatus for the blower;

Fig. 7 is an enlarged sectional view through the blower with parts omitted;

Fig. 8 is an exterior view of a portion of the outer casing of the blower showing the adjusting ring for moving the collector air vanes, the parts being in position where the vanes are open;

Fig. 9 is a view similar to Fig. 8 showing the position of the parts when the collector air vanes are closed;

Fig. 10 is a view showing the power connection to the controlling ring;

Fig. 11 is a view showing a modified construction where the thermostat acts directly on the vanes.

Like numerals refer to like parts throughout the several figures.

Referring now to the drawings wherein I have illustrated one form of the device, Fig. 1 shows an automobile 1 having a radiator 2. Located in front of the radiator is a centrifugal blower. This blower has a stationary casing 3 which is semi-spherical or bullet shaped. It is provided at the end with an opening 4, and there is preferably a strainer 5 across this opening. The centrifugal blower is provided with the rotatable vanes 6 connected with the shaft 7 driven from the motor. These vanes 6 are connected to the rotatable casing 8 which rotates with the vanes. In proximity to the vanes 6 are a series of collector vanes 9. On the outside of these collector vanes is the stationary casing 10. The collector vanes 9 are movably mounted in position so that they may be moved to a position substantially at right angles to the face of the radiator, as shown in Fig. 2, or they may be moved to a closed position substantially parallel with the face of the radiator so as to act as closures to prevent air from passing through the radiator.

In the construction shown these collector vanes 9 have pivots 11 at the top and bottom. These pivots may be separate pivots or a single pivot extending across the width of the collector vanes, as shown in Fig. 7. These pivots 11 are mounted at their outer ends in the stationary member 12, and at their inner ends in the stationary member 13. The member 13 has a forwardly and outwardly projecting portion 14 which extends along a portion of the edges of the vanes 9 when they are in their open position. Some suitable means is provided for moving these vanes to their different positions. As herein shown there is a sliding ring 15 extending around the member 12. This ring is provided with a series of inclined slots 16, one in proximity to each collector vane 9. A connecting member 17 is connected with each vane 9, each projecting into its associated slot 16 in the ring 15. The member 12 is provided with a slot 12a for each pin 17, see Figs. 8 and 9, and the pins 17 move with their associated vanes, the slots 12a and 16 being of such length and proportion that when the ring 15 is moved the proper amount, the vanes 9 are moved from the dotted position as shown in Fig. 8 to the position shown in Fig. 9, that is from their open to their closed positions. When the vanes 9 are in their open position, the parts are in the position shown in Figs. 7 and 8. When it is desired to move the vanes to their closed position, the ring 15 is moved and the connecting member 17 slides along the inclined slot 16, and since they are connected to the vanes at a point at a distance from the pivots 11, the vanes will be moved to a position parallel to the face of the radiator, as shown in dotted lines in Fig. 9. By moving the ring in the opposite direction the vanes will be moved back to their open positions. It is of course evident that these vanes may be moved to any desired intermediate position. It will therefore be seen that by manipulating or sliding the ring 15 the vanes may be moved to their open or their closed positions. When the collector vanes 9 are moved to their closed position the air cannot pass through the radiator, and hence the centrifugal blower will be doing no work and the power required to drive it will be reduced to a minimum, being only that required to overcome friction and inertia. The work required to move the air will be entirely eliminated, and hence the power required from the engine to rotate the part 6 will be negligible.

I prefer to provide some automatic means for automatically controlling the collector vanes 9 in response to the demands of the system. This device acts when the heat of the cooling liquid from the engine rises above a predetermined amount to open the collector vanes, and when this heat falls below a predetermined amount to close them, that is the vanes are opened when the system requires cooling of the cooling liquid, and will partially close them when the system does not require further cooling of the cooling liquid. I have illustrated in Fig. 6 one form of this automatic controlling device. In this construction a thermostat 18 is located in a proper position to be acted upon by the cooling liquid. It may, for example, be located so that the liquid in the radiator acts upon it, as shown in Fig. 6. The thermostat has a lever 19 connected therewith, and this lever is connected with the pistons 20 and 21 in the cylinder 22. The cylinder 22 is open at its upper end 22a and is provided at its lower end with the lateral port 22b, see Fig. 6. The cylinder 22 is connected by a pipe 23 with the engine cylinders, preferably through the inlet manifold 24. One end of the cylinder 22 is connected by a pipe 25 with the cylinder 26, and the other end of the cylinder 22 is connected by a pipe 27 with the cylinder 26, the two connections being on opposite sides of the piston 28. The thermostat 18, by means of the lever 19, moves the pistons 20 and 21 so as to control the ports at the ends of the pipes 26 and 27, and thereby connecting the cylinder 22 with either the pipe 25 or 27, as the conditions warrant. The piston 28 is provided with a piston rod 29 which is connected to an arm 30 of a bell crank lever pivoted at 31, the other arm 32 of the bell crank lever being connected with the control member 33, which is shown as a flexible wire and which passes through a guide 34 bent at one end, as indicated in Fig. 6. The other end of the control member 33 is connected with the ring 15 in any desired manner so as to move it in response to action of the thermostat.

In the construction shown the control member 33 is threaded at the end, see Fig. 10, and has a nut 35 thereon. The ring 15 has a bifurcated projection 36 between the members of which the nut 35 is received. The nut is provided with projections 37 which fit into slots 38 in the member 36 and is held in place by the pin 39.

In Figure 11 I have shown a modified construction where the lever arm 19 of the thermostat 18 is directly connected to the control member 33 by means of a link 40 which is connected to the arm 30 of the bell crank lever. The arm 32 of the bell crank lever is connected to the control member 33. The control member 33 is connected with the ring 15 in any desired manner, as for example, as previously explained in connection with Fig 10. The shaft 7 of the centrifugal blower is connected with the engine shaft 41 in any desired manner, as by means of the belts 42 and the pulleys 43, 44 and 45. Means is provided for disconnecting the centrifugal fan from the motor by means of a suitable clutch. As herein shown, the pulleys 43 and 44 are rotatably mounted upon the shaft and have clutch members on the opposed sides. A clutch member 46 is located between them and is splined to the shaft, but is free to slide therealong. Connected with this clutch member is a controlling lever 47 which is connected by a member 48 with the panel board 49 so that it may be actuated by the driver. In this construction it will be noted that the two pulleys 45 are of different diameters. When the clutch 46 connects the shaft with the pulley 43, the shaft is rotated at a certain speed, and when the clutch connects the shaft to the pulley 44, said shaft will be rotated at a higher speed, due to the larger diameter of the pulley on the driving engine shaft.

In the particular construction shown I have illustrated a means for directing air against the wind shield 50 of the automobile. It is of course evident that this construction may be omitted, but when it is used in connection with the present device a section 51 of the radiator is omitted, see Figs. 1 and 2, and the collector vane controlling that section may be omitted. A pipe 52 is connected with the section 51 and is provided with the separated nozzles 53 and 54 which are in proximity to the wind shield 50, see Fig. 1, and which direct warm air along the face of the wind shield.

I have described in detail a particular construction embodying the invention, but it is of course evident that the parts may be varied in many particulars without departing from the spirit of the invention as set forth in the claims hereto appended, and I therefore do not wish to be limited to the particular construction shown.

The use and operation of my invention are as follows:

When the automobile engine is set in operation and the blower connected therewith, the vanes 6 are rotated, and when the collector vanes 9 are in their open position, as shown in Fig. 2, air is directed through the radiator to cool the cooling liquid passing therethrough. When the construction for directing air along the wind shield is used, air will also pass through the section 51 of the radiator into the pipe 52 and out the nozzles 53 and 54 so as to be directed along the wind shield.

When the engine is first started up the cooling liquid is cool and the collector air vanes 9 will be in their closed position. When the engine heats up and the temperature of the cooling liquid rises a predetermined amount, the thermostat 18 acts to move the pistons 20 and 21. When the thermostat becomes cooled, as hereinbefore set out, the lever 19 is moved so as to move the pistons 20 and 21 downwardly.

The pipe 23 is then connected through the cylinder 22 with the pipe 27 so that the vacuum acts in the cylinder 26 below the piston 28, thereby moving the piston 28 downwardly. This moves the rod 29 and the bell crank lever 30, 31 and the control member 33 so as to move the ring 15 to move the vanes 9 to their closed positions. When the temperature of the liquid rises above a predetermined point the thermostat acts to move the pistons 20 and 21 upwardly until the piston 20 is above the end of the pipe 25 and the piston 21 is above the end of the pipe 27. This then connects the engine cylinders through the pipe 23, piston 22 and pipe 25 with the cylinder 26 above the piston 28. The vacuum then acts and causes the piston 28 to move upwardly. This moves the bell crank lever and controlling member 33 so as to move the collector vanes to their open position. The blower which is running at all times when the car is running is then brought into operation to blow the air through the radiator to cool the liquid therein.

When the pistons 20 and 21 are moved to close the ends of the pipes 25 and 27, the vanes will remain in the position they occupy at that time, until the thermostat moves the pistons 20 and 21 to uncover the ends of these pipes.

When the collector vanes are moved to their closed positions, the vanes 6 of the centrifugal blower, while still revolving, will not cause the air to pass through the blower, and hence this movement of the collector vanes results in the closing off of the air through the centrifugal blower. Any other method for closing off this air will secure the same result of reducing the power required to run the centrifugal blower.

I claim:

1. An automobile radiator cooling apparatus comprising a radiator with air passageways therethrough, a centrifugal blower in front of said radiator, an internal combustion engine for operating the automobile, operatively connected with said centrifugal blower, the radiator being located between the centrifugal blower and the engine, and means for closing off the passage of air through said radiator while the centrifugal blower is running, whereby the power required to run the centrifugal blower is reduced.

2. An automobile radiator cooling apparatus comprising a radiator with air passageways therethrough, a centrifugual blower in front of said radiator, an internal combustion engine for operating the automobile, operatively connected with said centrifugal blower, the radiator being located between the centrifugal blower and the engine, and means for closing off the passage of air through said radiator while the centrifugal blower is running, responsive to the cooling requirements of the system, whereby the power required to run the centrifugal blower is reduced.

3. An automobile radiator cooling apparatus comprising a radiator having air passageways therethrough, a centrifugal blower in proximity to said radiator having revolving vanes, a driving shaft for said blower and a series of collector vanes forming a part of said centrifugal blower and located within the casing thereof and between the revolving vanes and the radiator, said collector vanes surrounding the shaft of the blower, an internal combustion engine for operating the automobile, operatively connected with said centrifugal blower, and means for moving said collector vanes to obstruct the passage of air through the radiator while the centrifugal blower is in operation.

4. An automobile radiator cooling apparatus comprising a radiator having air passageways therethrough, a centrifugal blower in proximity to said radiator having revolving vanes, a shaft for said blower, a series of collector vanes forming a part of said centrifugal blower and located within the casing thereof and between the revolving vanes and the radiator movably mounted in position and surrounding the shaft of the blower, an internal combustion engine for operating the automobile, operatively connected with said centrifugal blower, an actuating device for moving said collector vanes to their open or closed positions, and a thermostat for controlling said actuating device.

5. An automobile radiator cooling apparatus comprising a radiator having air passageways therethrough, a centrifugal blower in proximity to said radiator having revolving vanes, a shaft for said blower, a series of collector vanes forming a part of said centrifugal blower and located within the casing thereof and between the revolving vanes and the radiator, said collector vanes pivotally mounted in position and surrounding the shaft of the blower, actuating mechanism for moving said collector vanes about their pivotal points to move them to close the air passageways through the radiator while the centrifugal blower is in operation.

6. An automobile radiator cooling apparatus comprising a radiator having air passageways therethrough, a centrifugal blower in front of said radiator having revolving vanes, a series of collector vanes forming a part of said centrifugal blower and located between the revolving vanes and the radiator, pivots by which said collector vanes are pivotally mounted, a movable ring extending around the exterior of said collector vanes, connecting pieces connected with said ring and with said vanes at a point at a distance from their pivots, inclined slots in said movable ring along which said connecting pieces move when the ring is moved to move said collector vanes to their closed positions.

7. An automobile radiator cooling apparatus comprising a radiator having air passageways therethrough, a centrifugal blower in proximity to said radiator having revolving vanes, a shaft for said blower, a series of collector vanes forming a part of said centrifugal blower and located within the casing thereof and between the revolving vanes and the radiator, pivots upon which said collector vanes are pivotally mounted, said collector vanes surrounding the shaft of the blower, actuating mechanism for moving said collector vanes about their pivots, a thermostat responsive to variations in temperature of the cooling liquid, and a connection between said thermostat and said actuating mechanism for setting the actuating mechanism in operation when the temperature varies a predetermined amount.

8. An automobile radiator cooling apparatus comprising a radiator having air passageways therethrough, a centrifugal blower in proximity to said radiator having revolving vanes, a shaft for said blower, a series of radially extending collector vanes forming a part of said centrifugal blower and located between the revolving vanes and the radiator, radially extending pivots upon which said collector vanes are pivotally mounted, said collector vanes surrounding the shaft of the blower, actuating mechanism for moving said collector vanes about their pivots comprising a thermostat responsive to variations in temperature of the cooling liquid, a power developing device adapted to be connected with said actuating mechanism, said power developing device set in operation by the said thermostat when the temperature varies a predetermined amount.

9. An automobile radiator cooling apparatus comprising a radiator, an open passageway therethrough, open at all times when the automobile is in operation, a centrifugal blower in front of said radiator, the radiator being located between the blower and the engine so that the air when the automobile is moving forward, enters the blower before it enters the radiator, said blower adapted to move air through said open passageway so that it will be heated by the radiator, a pipe leading from said open passageway to a point in proximity to the wind shield of the automobile, and a nozzle at the end of said pipe for directing the heated air along said wind shield.

10. An automobile radiator cooling apparatus comprising a radiator, an open passageway therethrough having a cross sectional area smaller than the cross sectional area of the radiator, means for shutting off the passage of air through said radiator while maintaining the open passageway open, and means for moving air through said open passageway, and a pipe leading from said open passageway to a point in proximity to the wind shield of the automobile for directing heated air along said wind shield.

WILLARD L. MORRISON.